United States Patent

Hori

[11] Patent Number: 5,909,240
[45] Date of Patent: Jun. 1, 1999

[54] IMAGE PROCESSING APPARATUS

[75] Inventor: Taizou Hori, Yokohama, Japan

[73] Assignee: Canon Kabushiki Kaisha, Tokyo, Japan

[21] Appl. No.: 08/617,050

[22] Filed: Mar. 18, 1996

[30] Foreign Application Priority Data

Mar. 30, 1995 [JP] Japan .................................. 7-073327
May 23, 1995 [JP] Japan .................................. 7-123908

[51] Int. Cl.⁶ .................................................. H04N 7/12
[52] U.S. Cl. ........................................ 348/78; 348/403
[58] Field of Search ............................ 348/78, 169, 164,
348/405, 409, 403, 420, 345, 349, 350;
H04N 7/12

[56] References Cited

U.S. PATENT DOCUMENTS

| | | | |
|---|---|---|---|
| 3,507,988 | 4/1970 | Holmes ...................................... | 348/78 |
| 4,028,725 | 6/1977 | Lewis ....................................... | 358/103 |
| 4,405,943 | 9/1983 | Kanaly ..................................... | 358/133 |
| 4,692,806 | 9/1987 | Anderson et al. ....................... | 358/209 |
| 5,103,306 | 4/1992 | Weiman et al. ......................... | 358/133 |
| 5,432,556 | 7/1995 | Hatano et al. ........................... | 348/420 |
| 5,521,634 | 5/1996 | McGary .................................. | 348/169 |
| 5,568,199 | 10/1996 | Kajimoto et al. ....................... | 348/405 |

FOREIGN PATENT DOCUMENTS 0402954 12/1990 European Pat. Off. .
0557007 8/1993 European Pat. Off. .

OTHER PUBLICATIONS

Patent Abstracts of Japan No. JP63217880, published Sep. 9, 1988, vol. 13, No. 8.

*Primary Examiner*—Brian Casler
*Assistant Examiner*—Luanne Din
*Attorney, Agent, or Firm*—Robin, Blecker & Daley

[57] ABSTRACT

An image processing apparatus divides an image signal corresponding to one frame into a plurality of blocks, and performs compression encoding for each block. The apparatus includes a display unit for displaying the image signal, a designation unit for designating a position desired by a user on the display unit, and a compression encoding therefor in accordance with the desired position designated by the designation unit. An image processing apparatus divides an image signal corresponding to one frame into a plurality of blocks, the image signal being output from a camera unit having focus adjustment unit for performing focus adjustment, and performs compression encoding for each block. The apparatus includes a display unit for displaying the image signal, a designation unit for designating a position desired by a user on the display unit, a compression encoding unit for weighting the blocks and performing compression encoding therefor in accordance with an output from the designation unit, and a control unit for controlling the focus adjustment unit in accordance with the desired position designated by the designation unit.

28 Claims, 14 Drawing Sheets

$L_A < L_C < L_B < L_D < L_E$

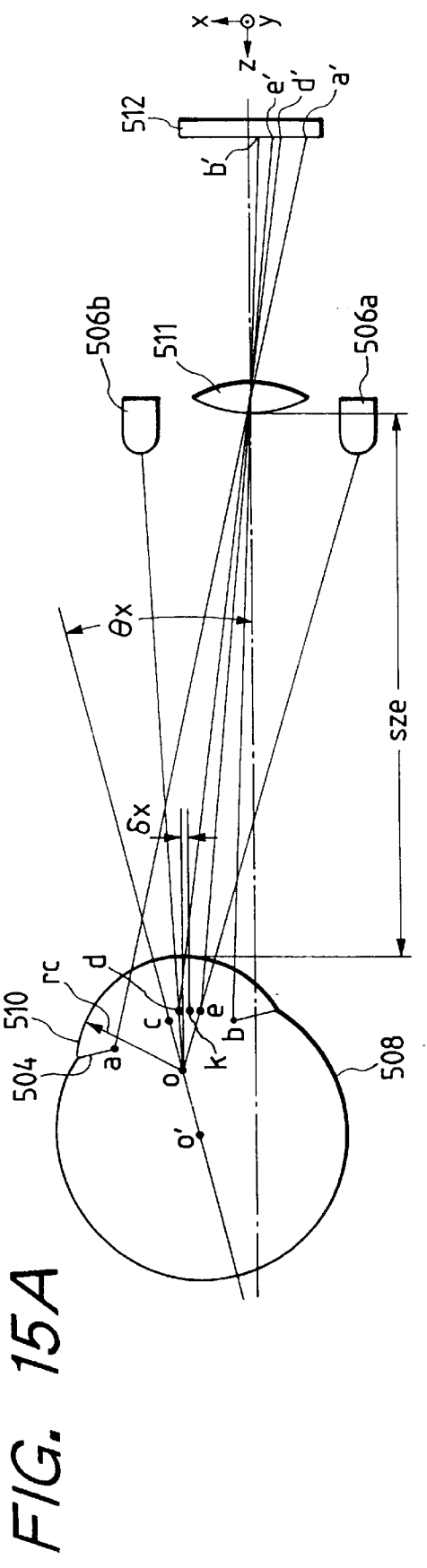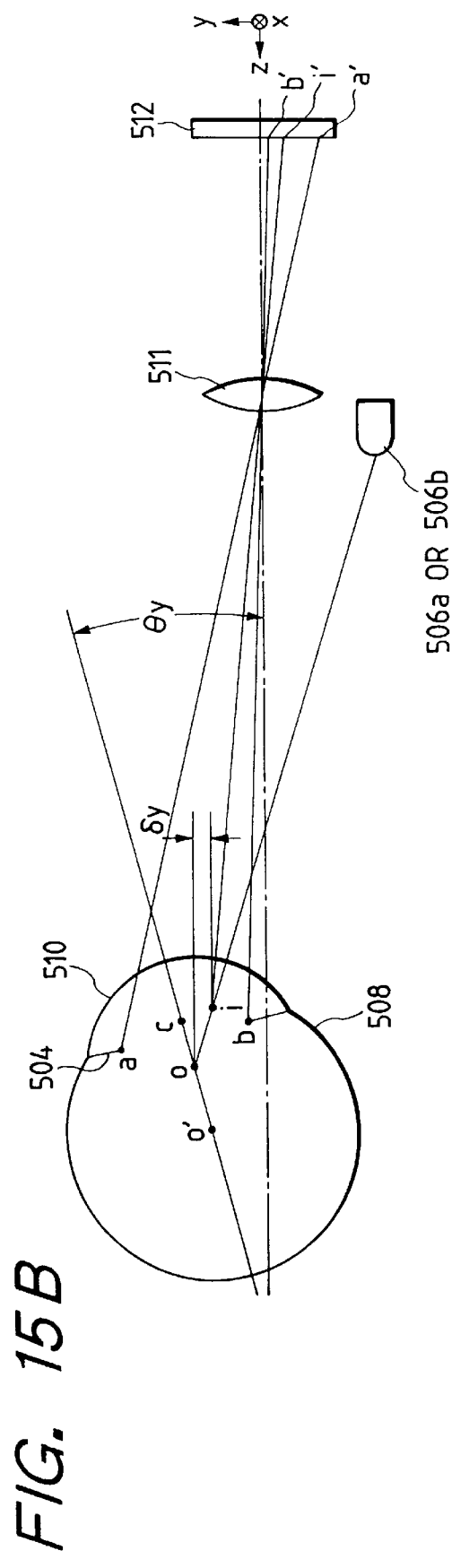
FIG. 15A
FIG. 15B

IMAGE PROCESSING APPARATUS

BACKGROUND OF THE INVENTION

1. Field of the Invention

The present invention relates to an image processing apparatus and, more particularly, to compression encoding processing for image signals.

2. Related Background Art

As an apparatus for recording and reproducing image signals, a VTR based on a high-efficiency encoding method has been proposed. In this apparatus, the pixels of a frame are digitized and grouped into blocks each consisting of a predetermined number of pixels, and entropy coding is then performed by orthogonal transformation (e.g., discrete cosine transform (DCT)) and quantization.

As one of such conventional techniques, a home digital VTR format has been proposed. In this technique, an existing television signal is digitized, and the resultant information is recorded after it is compressed to about ⅕.

FIG. 17 is a block diagram showing the arrangement of a VTR with a built-in camera as one of the proposed home digital VTRs.

Referring to FIG. 17, the VTR includes a lens group 1, an image pickup element 2 such as a CCD, a camera signal processing circuit 3 for converting a signal from the image pickup element 2 into a television signal, an LCD display circuit 4 for displaying a photographed image on an LCD (liquid crystal display) monitor, an LCD monitor 5 used as a finder, and a block dividing and shuffling circuit 6 for dividing a television signal corresponding to one frame into a plurality of blocks, and shuffling the blocks.

A motion detection circuit 7 detects whether a picture exhibits a larger or small motion (the correlation between frames is larger or small). A DCT calculation weighting circuit 8 performs a weighting operation in accordance with DCT calculation and a spatial frequency component. A sort circuit 9 sorts DCT coefficients, which are obtained by the DCT calculation weighting circuit 8 upon orthogonal transformation, in the order of increasing frequencies.

A code amount estimation circuit 10 obtains a quantization step width with which a code amount obtained by quantization of data of a predetermined number of blocks and variable length encoding is made constant. An adaptive quantization circuit 11 performs quantization upon reception of the estimation result from the code amount estimation circuit 10. A variable length encoding circuit 12 performs variable length encoding by using two-dimensional Huffman codes. A deshuffling circuit 13 deshuffles data to their original positions on a frame obtained before data compression. A recording processing circuit 14 adds signals required for a recording operation, e.g., an error correction code, sync signals, and a pilot signal. The apparatus also includes a magnetic head 15 and a magnetic tape 16.

The operation of the digital VTR with the built-in camera having the above arrangement will be described below.

First of all, an object image is formed on the image pickup element 2 such as a CCD through the lens group 1, and converted into an electrical signal.

The electrical signal from the image pickup element 2 is subjected to γ correction, color matrix processing, and the like in the camera signal processing circuit 3 to form a television signal.

A general VTR with a built-in camera (camcorder) allows an operator to monitor a photographed image through the finder. An output from the camera signal processing circuit 3 is converted into an LCD driving signal by the LCD display circuit 4 to display an image on the LCD monitor 5.

The output from the camera signal processing circuit 3 is also sent to a recording system. The block dividing and shuffling circuit 6 divides and shuffles blocks.

The output from the camera signal processing circuit 3 may be analog or digital data. If the output is analog data, an A/D converter is to be connected to the input side of the block dividing and shuffling circuit 6.

A method of dividing and shuffling blocks will be described below with reference to FIGS. 2 and 3.

First of all, signals corresponding to one frame, i.e., a luminance (Y) signal and color difference (R-Y and B-Y) signals, are divided into DCT blocks each consisting of (8×8) pixels.

Subsequently, as shown in FIG. 2, four Y signal blocks, one R-Y signal block, and one B-Y signal block, i.e., a total of six DCT blocks, which are located at the same position on the frame are grouped into a macro block as a unit.

As shown in FIG. 3, one frame is divided into five areas A to E, and each area is divided into 10 blocks each consisting of 27 macro blocks.

That is, one frame is divided into five areas in the horizontal direction and 10 areas in the vertical direction. Each of these divided blocks is called a super-block.

Shuffling is performed in units of macro blocks. In the subsequent circuits, one macro block is selected from each of the five areas A to E according to a predetermined rule, and processing is performed such that the image data of the five macro blocks collected from the respective areas becomes fixed length data after data compression.

The DCT calculation weighting circuit 8 performs DCT calculation in units of DCT blocks, and performs a weighting operation such that a component having a low spatial frequency exhibits a smaller distortion than a component having a high spatial frequency.

The DCT calculation weighting circuit 8 performs intrafield processing when a picture exhibits a large motion, and performs intraframe processing when a picture exhibits a large motion. The motion detection circuit 7 determines processing to be performed by the DCT calculation weighting circuit 8.

The sort circuit 9 sorts DCT coefficients, which are obtained by the DCT calculation weighting circuit 8 upon orthogonal transformation, in the order of increasing frequencies. A quantization step width for the sorted image data is determined in the adaptive quantization circuit 11 in accordance with the frequency of an AC component. As described above, control is performed such that the data of the five macro blocks becomes fixed length data after compression. This control is performed by the code amount estimation circuit 10. The code amount estimation circuit 10 sets a parameter in accordance with the characteristics of an image corresponding to each DCT block, and obtains an quantization step width corresponding to the parameter and a frequency component, thereby realizing fixed length conversion with efficient bit allocation to each DCT block.

Although the image data quantized by the adaptive quantization circuit 11 is encoded into variable length codes by the variable length encoding circuit 12, the five macro blocks are almost kept to be fixed length data.

The deshuffling circuit 13 deshuffles the image data compressed by the deshuffling circuit 13 to the original positions on the frame. By deshuffling the data to the original positions on the frame, a picture in the fast playback mode is made more legible.

The recording processing circuit 14 adds signals required for a recording operation, e.g., an error correction code, sync signals, and a pilot signal, to the deshuffled image data. The resultant data is recorded on the magnetic tape 16 by the magnetic head 15.

The above prior art is very effective when the entire frame of a picture is uniformly compressed. In general, however, a photographer tends to fix his/her eye on only an object to be photographed in a frame. In addition, when there are a plurality of objects at different distances, since only one target object is in focus, it is highly possible that the remaining objects are out of focus.

In spite of such a situation, however, according to the above prior art, since bits are uniformly allocated to the entire frame, many bits are used for even unnecessary portions.

SUMMARY OF THE INVENTION

The present invention has been made in consideration of the above situation, and has as its object to provide an image processing apparatus which can perform compression encoding with respect to the image data of a portion desired by a user while preventing a deterioration in image quality.

In order to achieve the above object, according to an aspect of the present invention, there is provided an image processing apparatus for dividing an image signal corresponding to one frame into a plurality of blocks, and performing compression encoding for each block, comprising display means for displaying the image signal, designation means for designating a position desired by a user on the display means, and compression encoding means for weighting the blocks and performing compression encoding therefor in accordance with an output from the designation means.

It is another object of the present invention to provide an image processing apparatus which allow focus adjustment of a camera unit with respect to the image data of a portion (an object to be photographed) desired by a user, and can perform compression encoding with respect to the image data while preventing a deterioration in image quality.

In order to achieve the above object, according to an aspect of the present invention, there is provided an image processing apparatus for dividing an image signal corresponding to one frame into a plurality of blocks, and performing compression encoding for each block, the image signal being output from a camera unit having focus adjustment means for performing focus adjustment, comprising display means for displaying the image signal, designation means for designating a position desired by a user on the display means, compression encoding means for weighting the blocks and performing compression encoding therefor in accordance with an output from the designation means, and control means for controlling the focus adjustment means in accordance with the desired position designated by the designation means.

Other objects, features and advantages of the invention will become apparent from the following detailed description taken in conjunction with the accompanying drawings.

BRIEF DESCRIPTION OF THE DRAWINGS

FIGS. 15A and 15B are views showing the principle of a viewpoint detection method;

DETAILED DESCRIPTION OF THE PREFERRED EMBODIMENTS

Figure 1:
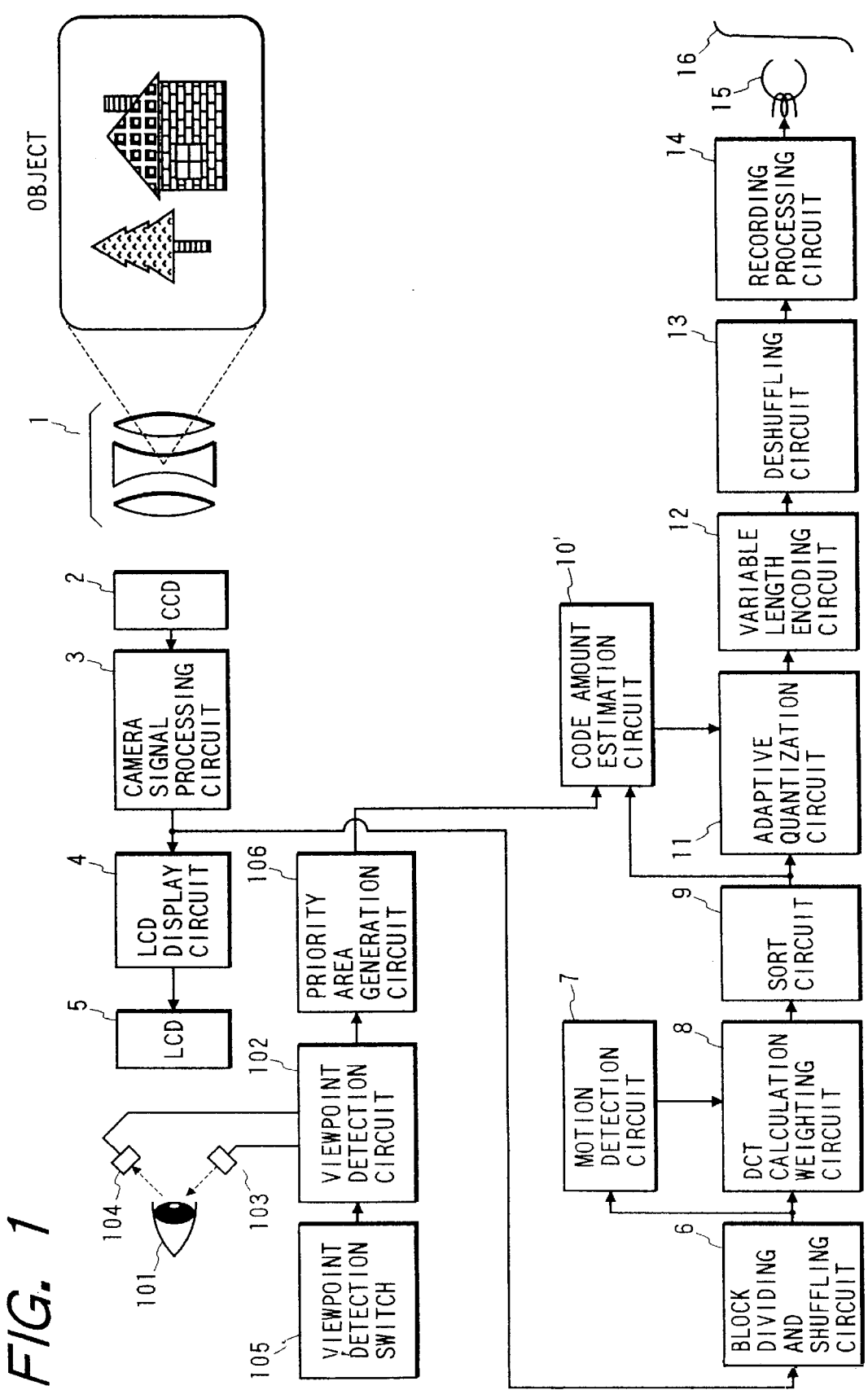
FIG. 1 is a block diagram showing the arrangement of a VTR with a built-in camera according to the first embodiment of the present invention.
Figure 2:
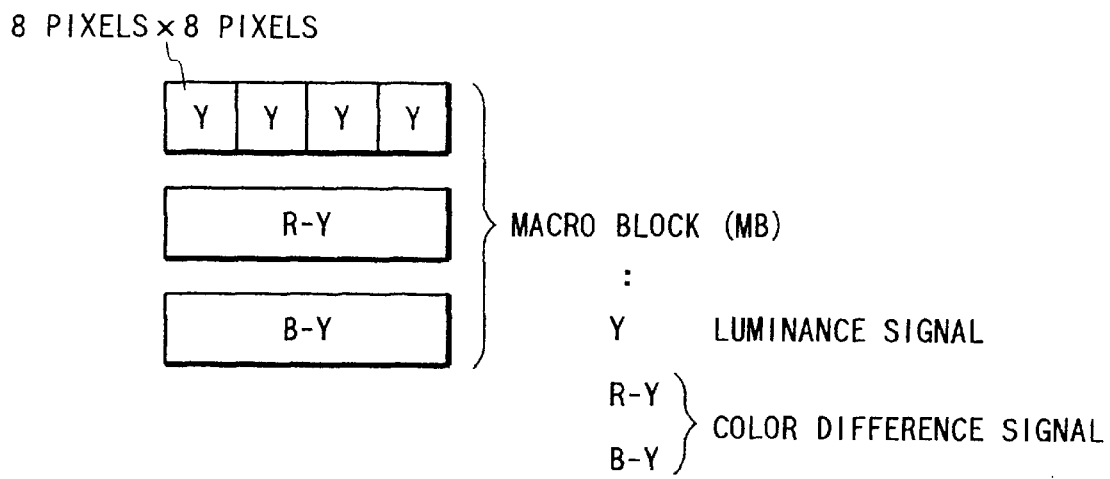
FIG. 2 is a view for explaining macro blocks.
Figure 3:
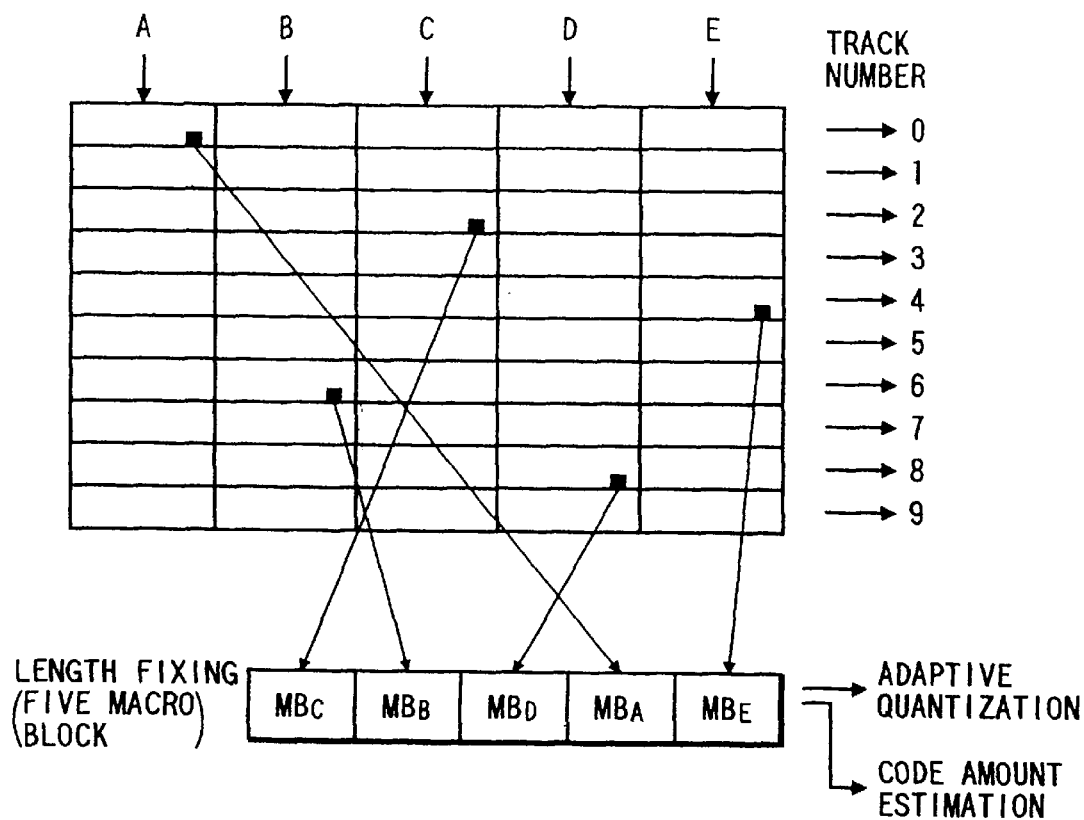
FIG. 3 is a view for explaining shuffling.

FIG. 1 is a block diagram showing the arrangement of a VTR with a built-in camera according to the first embodiment of the present invention. The same reference numerals in FIG. 1 denote the same parts as in FIG. 11, and a description thereof will be omitted.

Referring to FIG. 1, an eyeball 101 of a photographer monitors an image displayed on an LCD monitor 5.

An infrared-emitting diode (IRED) 103 irradiates infrared light to detect the viewpoint position of the eyeball 101. A CCD sensor 104 receives infrared light reflected by the eyeball 101. A viewpoint detection circuit 102 drives the infrared-emitting diode 103, and analyzes the viewpoint position on the basis of information from the CCD sensor 104. A viewpoint detection switch 105 ON/OFF-controls the operation of the viewpoint detection circuit 102. A priority area generation circuit 106 generates area information consisting of a coordinates group on a frame on the basis of viewpoint position information created by the viewpoint detection circuit 102.

The operation of the VTR with the built-in camera having the arrangement in FIG. 1 will be described below.

Similar to the prior art, first of all, an object image is formed on an image pickup element 2 through a lens group 1 and converted into an electrical signal. The signal is then processed to display an image on the LCD monitor 5.

If the viewpoint detection switch 105 is ON, the viewpoint detection circuit 102 drives the infrared-emitting diode 103 to irradiate infrared light onto the eyeball 101, while the eyeball 101 of the photographer monitors the image on the LCD monitor 5. The CCD sensor 104 receives infrared light reflected by the eyeball 101. Viewpoint position information is then generated by using information from the CCD sensor 104. A viewpoint position detection method will be described later.

The priority area generation circuit 106 generates area information consisting of a coordinates group on a frame on the basis of the viewpoint position information from the viewpoint detection circuit 102. Meanwhile, an image signal from a camera signal processing circuit 3 is processed by a block dividing and shuffling circuit 6, a motion detection circuit 7, a DCT calculation weighting circuit 8, and a sort circuit 9, and the resultant image data is supplied to a code amount estimation circuit 10' and an adaptive quantization circuit 11, as in the prior art.

The code amount estimation circuit 101 estimates a code amount with a predetermined offset so that bit allocation is preferentially performed with respect to macro blocks included in a priority area generated by the priority area generation circuit 106 over the remaining macro blocks in a fixed length unit. With this operation, the code amount estimation circuit 10' controls a quantization step width for the adaptive quantization circuit 11.

This operation will be described with reference to FIGS. 5 and 6A to 6C.

Figure 4:
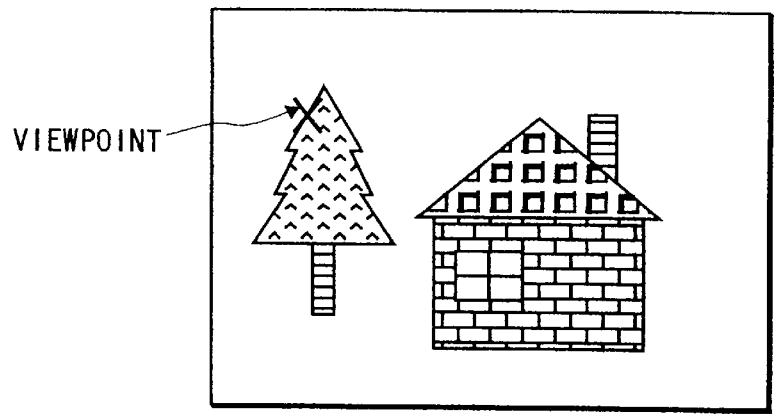
FIG. 4 is a view showing an image displayed on an LCD monitor 5.

FIG. 4 shows an image on the LCD monitor 5. As shown in FIG. 4, a house is located in the center of the frame, and a tree is on the left side of the house.

Figure 5:
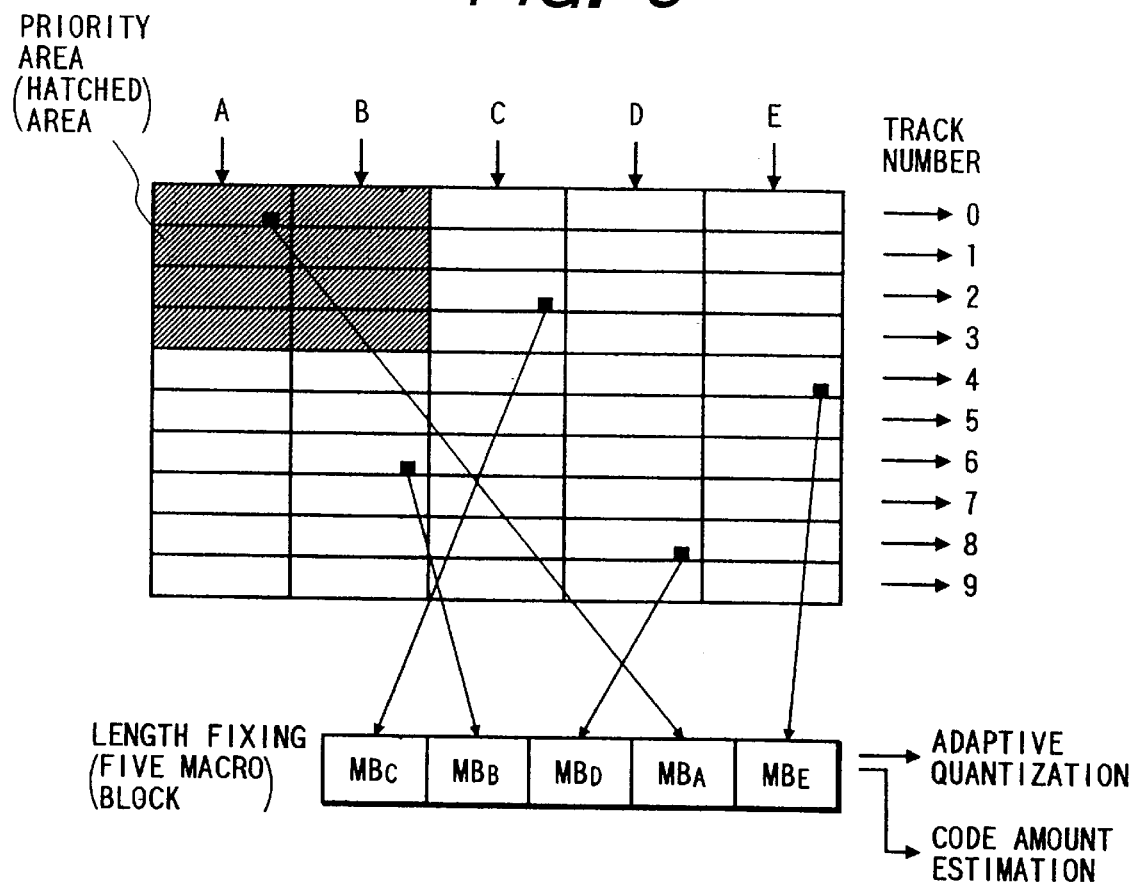
FIG. 5 is a view for explaining shuffling and a priority area.

The photographer fixes his eye on an upper portion (position indicated by "x") of the tree on the left side of the house. If the viewpoint detection switch 105 is ON, the coordinates of the viewpoint on the frame are obtained by the viewpoint detection circuit 102. As a result, viewpoint position information is generated. The priority area generation circuit 106 generates priority area information consisting of a coordinates group indicated by the hatched portion in FIG. 5 on the basis of the viewpoint position information. In a fixed length unit, five macro blocks are collected from five areas A to E according to a predetermined rule. Referring to FIG. 5, a macro block $MB_A$ is located in the priority area. Therefore, bit allocation is preferentially performed with respect to this block over the remaining macro blocks.

Figure 6A:
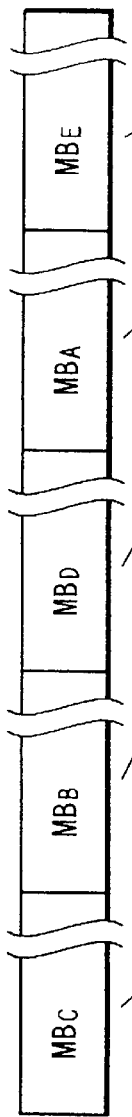
FIGS. 6A to 6C are views for explaining changes in bit allocation to image data when a viewpoint detection result is used.
Figure 6B:
Figure 6C:

FIGS. 6A to 6C are views showing changes in bit allocation upon operation of the viewpoint detection switch 105.

FIG. 6A shows the data of five macro blocks constituting one fixed length unit before compression.

FIG. 6B shows bit allocation after data compression when the viewpoint detection switch 105 is OFF.

In this case, data $D_C$, $D_B$, $D_D$, $D_A$, and $D_E$ are obtained after conversion to variable length codes. The five macro blocks are almost fixed length codes.

If this image is identical to that in the prior art, bit allocation is performed in the same manner.

FIG. 6C shows bit allocation after data compression when the viewpoint detection switch 105 is ON. Since the macro block $MB_A$ is in the priority area, bit allocation is preferentially performed with respect to this macro block over the remaining macro blocks. Methods of weighting a macro block in a priority area and the remaining macro blocks include a method of adding an offset to the image quality parameter of each DCT block to increase the amount of bits to be allocated, and a method of setting a predetermined difference or ratio between the quantization parameter of a macro block in a priority area and that of each of the remaining macro blocks. In any case, a bit amount $D_A$ of the macro block in the priority area after compression is larger than that when the viewpoint detection switch 105 is OFF.

Generally, the viewpoint position of the eyeball 101 slightly varies. However, the motions of the eyeball 101 are averaged by the viewpoint detection circuit 102 or the priority area generation circuit 106. In addition, timing adjustment with respect to an output from the sort circuit 9 is performed.

Although the data quantized by the adaptive quantization circuit 11 is encoded into variable length codes by a variable length encoding circuit, the data of the five blocks are almost fixed length codes.

A deshuffling circuit 13 deshuffles the compressed data to the original positions on the frame. A recording processing circuit 14 adds signals required for a recording operation, e.g., an error correction code, sync signals, and a pilot signal, to the deshuffled image data. The resultant data is recorded on a magnetic tape 16 by a magnetic head 15.

As described above, this embodiment exemplifies the VTR with the built-in camera. However, a signal from a circuit other than the camera signal processing circuit 3 may be used. In addition, the present invention can be applied to an apparatus other than the recording apparatus. For example, a data transmission apparatus can also perform compression encoding processing for the image data of a portion desired by a user while preventing a deterioration in image quality.

Figure 7:
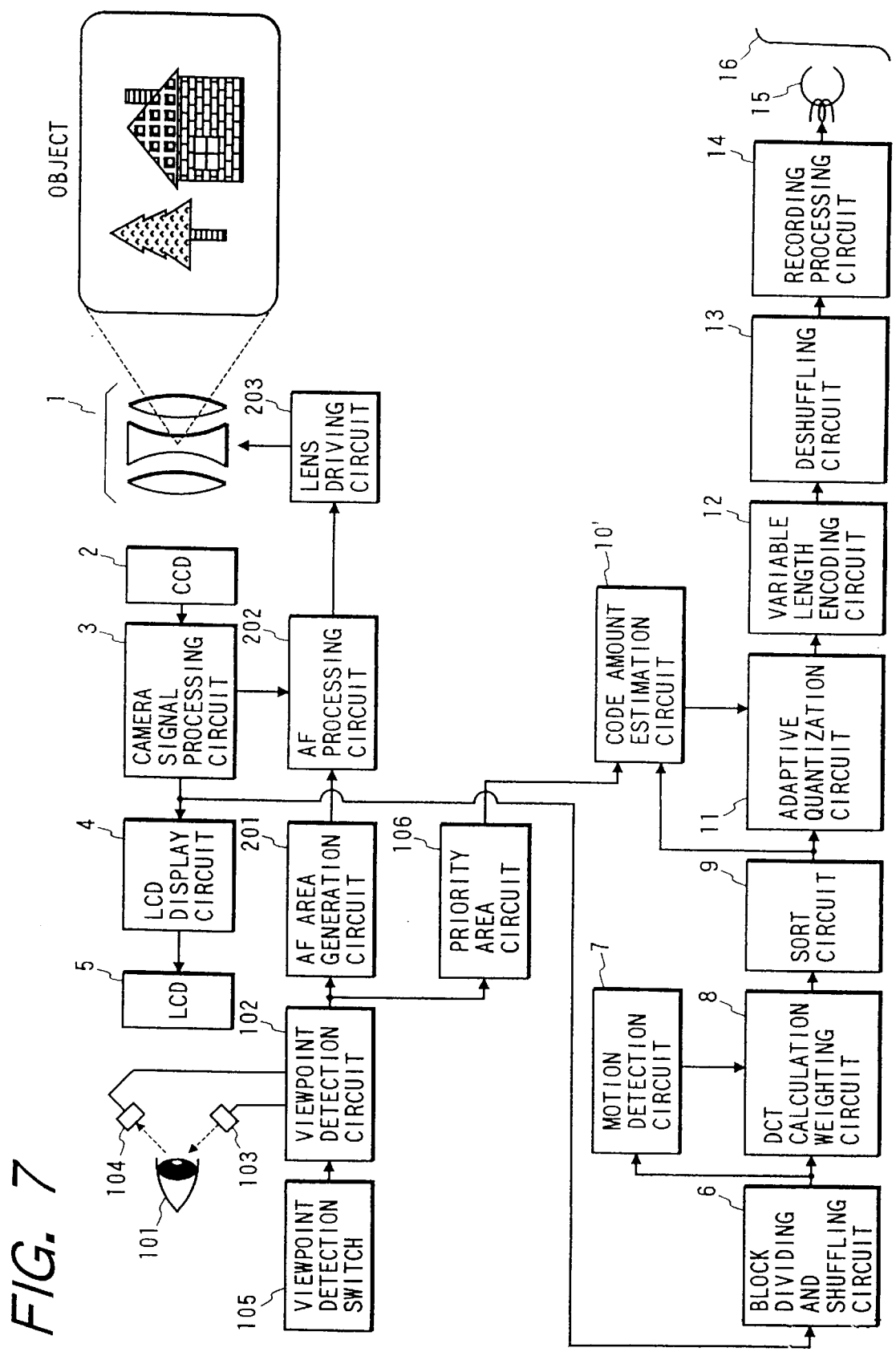
FIG. 7 is a block diagram showing the arrangement of a VTR with a built-in camera according to the second embodiment of the present invention.

FIG. 7 is a block diagram showing the arrangement of a VTR with a built-in camera according to the second embodiment of the present invention.

The same reference numerals in FIG. 7 denote the same parts as in FIG. 1, and a description thereof will be omitted.

Referring to FIG. 7, an AF area generation circuit 201 generates an automatic focusing area on a frame on the basis of viewpoint position information generated by a viewpoint detection circuit 102. An AF processing circuit 202 generates a focus control signal by using a portion, of the high-frequency component of an image signal from a camera signal processing circuit 3, which is included in the automatic focusing area generated by the AF area generation circuit 201. A lens driving circuit 203 drives a lens group 1 in accordance with the focus control signal generated by the AF processing circuit 202.

The operation of the VTR with the built-in camera having the arrangement in FIG. 7 will be described below. Assume that a house is located in the center of a frame, and a tree is on the left side of the house, and these objects are at different distances from a photographer. Similar to the first embodiment, first of all, each object image is formed on an image pickup element 2 through the lens group 1, and converted into an electrical signal. The signal is the processed to display an image on an LCD monitor 5.

If a viewpoint detection switch 105 is ON, the viewpoint detection circuit 102 drives an infrared-emitting diode 103 to irradiate infrared light onto an eyeball 101 of the photographer, while the eyeball 101 monitors the image on the LCD monitor 5. A CCD sensor 104 receives infrared light reflected by the eyeball 101, and generates viewpoint position information by using information from the CCD sensor 104.

Figure 8:
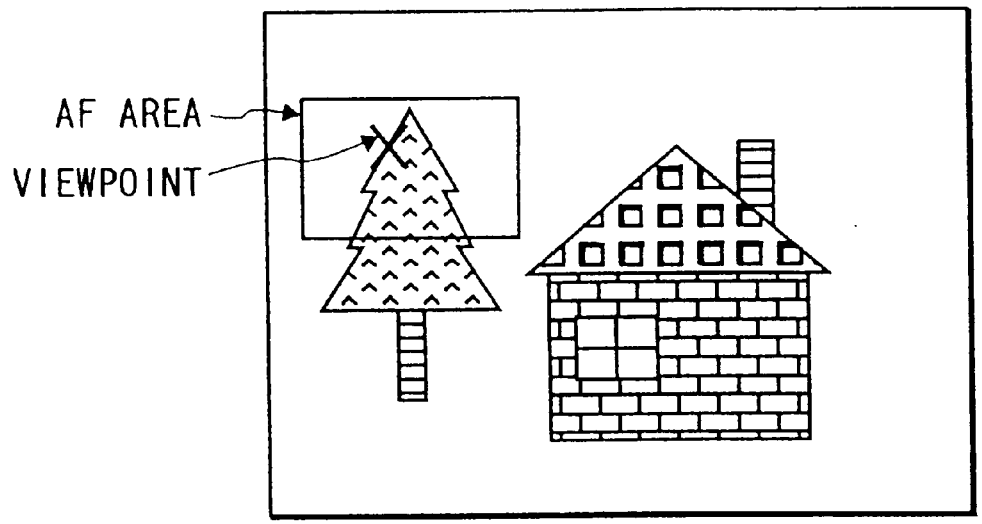
FIG. 8 is a view showing the relationship between the viewpoint of a photographer and an AF area.

If the photographer fixes his/her eye on an upper portion of the tree, as shown in FIG. 8, viewpoint position information is generated from the viewpoint (position indicated by "x").

The AF area generation circuit 201 generates an automatic focusing area ("AF AREA" in FIG. 8) on the basis of the viewpoint position information generated by the viewpoint detection circuit 102. The AF processing circuit 202 generates a focus control signal from the high-frequency component of the image signal from the camera signal processing circuit 3 and the automatic focusing area information. The lens driving circuit 203 then drives the lens group 1 to focus the camera on the upper portion ("AF AREA" in FIG. 8) of the tree. At this time, the house in the center of the frame is out of focus. Meanwhile, a priority area generation circuit 106 generates priority area information consisting of a coordinates group on the frame on the basis of the viewpoint position information from the viewpoint detection circuit 102.

Similar to the first embodiment, the image signal from the camera signal processing circuit 3 is processed by a block dividing and shuffling circuit 6, a motion detection circuit 7, a DCT calculation weighting circuit 8, and a sort circuit 9. The resultant image data is supplied to a code amount estimation circuit 10' and an adaptive quantization circuit 11.

The code amount estimation circuit 10' estimates a code amount with a predetermined offset such that bit allocation is preferentially performed with respect to a macro block included in a priority area generated by the priority area generation circuit 106 over the remaining macro blocks, thereby controlling a quantization step width for the adaptive quantization circuit 11.

That is, bit allocation is preferentially performed with respect to macro blocks near the upper portion of the tree in FIG. 8 over the macro blocks corresponding to the out-of-focus house in the center of the frame.

As described above, in this embodiment, the viewpoint detection switch 105, the viewpoint detection circuit 102, the infrared-emitting diode 103, and the CCD sensor 104 are used for both the automatic focusing function and the bit allocation function. However, these components may be separately used for these functions. In addition, one circuit may serve as both the AF area generation circuit 201 and the priority area generation circuit 106.

The present invention is also effective for apparatuses other than the recording apparatus, e.g., a data transmission apparatus.

Figure 9:
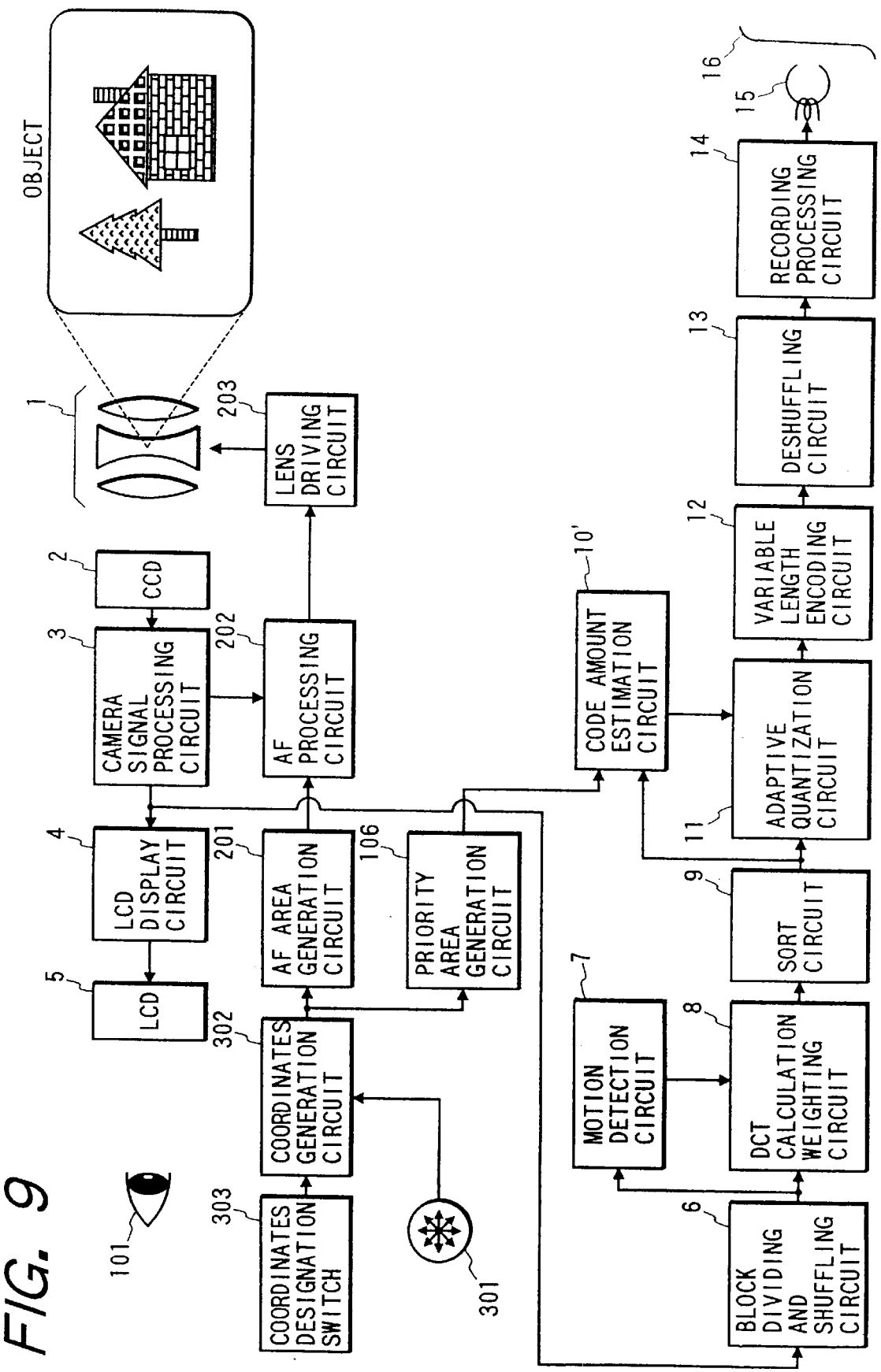
FIG. 9 is a block diagram showing the arrangement of a VTR with a built-in camera according to the third embodiment of the present invention.

FIG. 9 is a block diagram showing the arrangement of a VTR with a built-in camera according to the third embodiment of the present invention.

The same reference numerals in FIG. 9 denote the same parts as in FIG. 7, and a description thereof will be omitted. Only a method of designating a priority area in the third embodiment, which is different from that in the second embodiment, will be described below. Since other operations are the same as those in the second embodiment, a description thereof will be omitted.

A direction switch 301 is used by a photographer to designate coordinates on a finder frame. A coordinates generation circuit 302 generates coordinates information in accordance with a designation from the direction switch 301. A coordinates designation switch 303 performs ON/OFF-controls of the operation of the coordinates generation circuit 302. The operation of the VTR with the built-in camera having the arrangement in FIG. 9 will be described below. Assume that a house is located in the center of a frame, and a tree is on the left side of the house, and these objects are at different distances from a photographer. Similar to the first embodiment, first of all, each object image is formed on an image pickup element 2 through the lens group 1, and converted into an electrical signal. The signal is the processed to display an image on an LCD monitor 5.

If the coordinates designation switch 303 is ON, the coordinates generation circuit 302 generates coordinates information in accordance with a designation from the direction switch 301.

Figure 10:
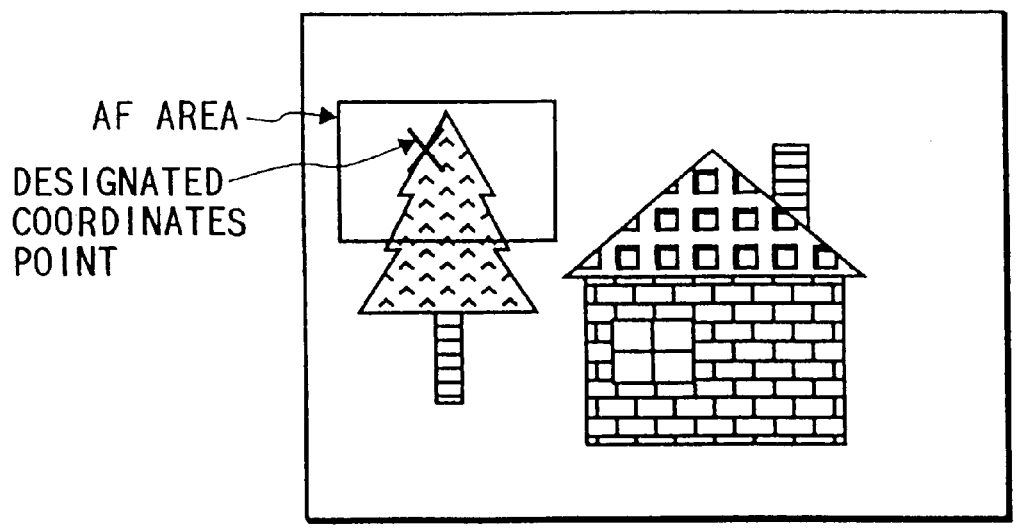
FIG. 10 is a view showing the relationship between the viewpoint of a photographer and an AF area.

When the photographer wants to fix his/her eye on an upper portion (position indicated by "x") of the tree as shown in FIG. 10, he/she turns on the coordinates designation switch 303, and operates the direction switch 301 to bring the AF area in the frame near the position indicated by "x".

An AF area generation circuit 201 generates an automatic focusing area (the AF area in FIG. 10) on the basis of the coordinates information generated by the coordinates generation circuit 302. An AF processing circuit 202 generates a focus control signal on the basis of the high-frequency component of an image signal from a camera signal processing circuit 3 and the automatic focusing area information, and a lens driving circuit 203 drives the lens group 1 to focus the camera on the upper portion (the AF area in FIG. 10) of the tree. At this time, the house in the center is out of focus. A priority area generation circuit 106 generates priority area information consisting of a coordinates group on the frame on the basis of the coordinates information from the coordinates generation circuit 302.

Similar to the second embodiment, the image signal from the camera signal processing circuit 3 is processed by a block dividing and shuffling circuit 6, a motion detection circuit 7, a DCT calculation weighting circuit 8, and a sort circuit 9. The resultant image data is supplied to a code amount estimation circuit 10' and an adaptive quantization circuit 11.

The code amount estimation circuit 10 estimates a code amount with a predetermined offset such that bit allocation is preferentially performed with respect to macro blocks included in the priority area generated by the priority area generation circuit 106 over the remaining macro blocks, thereby controlling a quantization step width for the adaptive quantization circuit 11.

That is, bit allocation is preferentially performed with respect to the macro blocks near the upper portion of the tree in FIG. 10 over the macro blocks corresponding to the out-of-focus house in the center of the frame.

Figure 11:
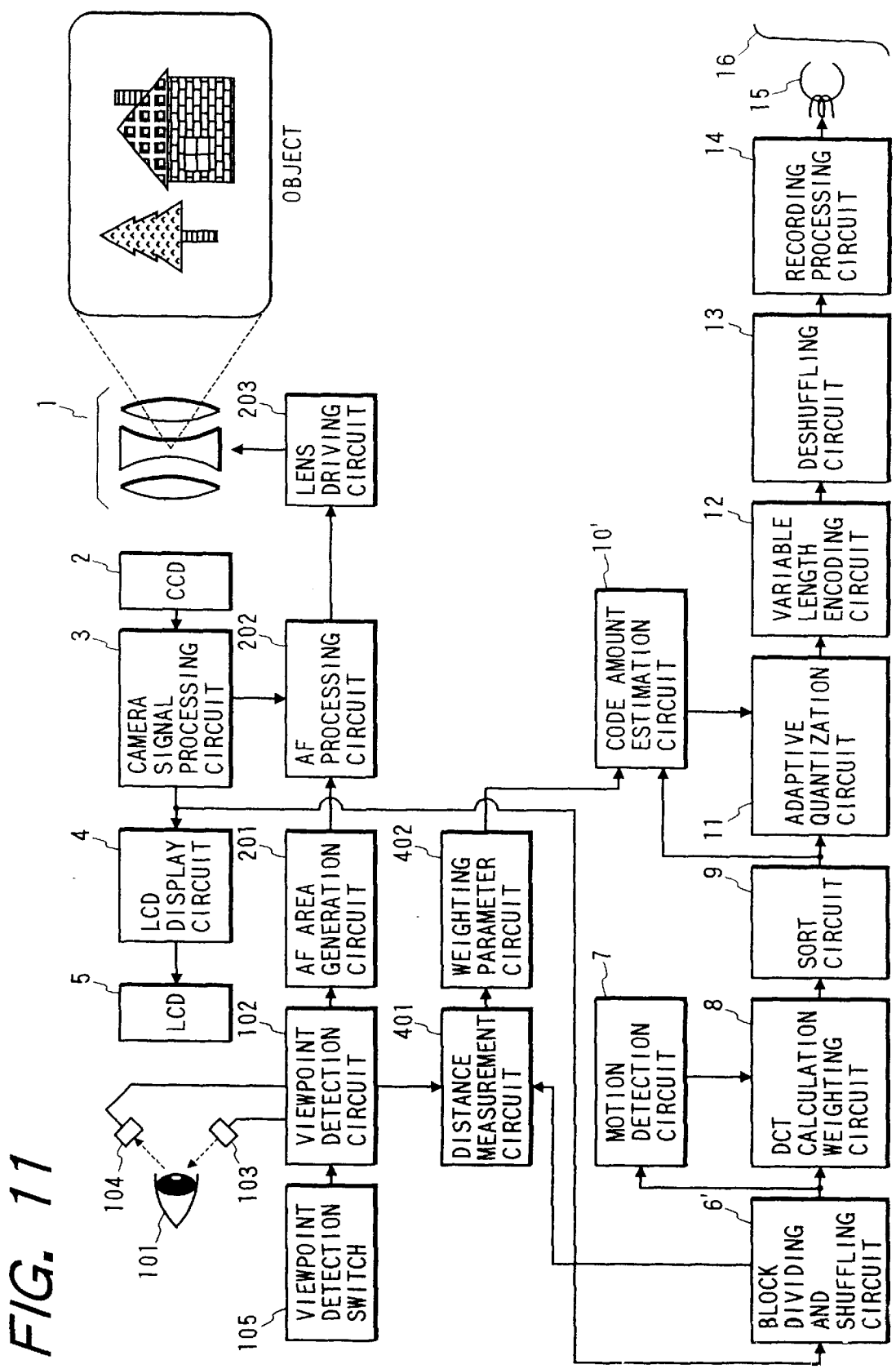
FIG. 11 is a block diagram showing the arrangement of a VTR with a built-in camera according to the fourth embodiment of the present invention.

FIG. 11 is a block diagram showing the arrangement of a VTR with a built-in camera according to the fourth embodiment of the present invention. The same reference numerals in FIG. 11 denote the same parts as in FIG. 7, and a description thereof will be omitted. Only weighting processing to be performed in data compression in the fourth embodiment, which is different from that in the second embodiment, will be described below. Other operations are the same as those in the second embodiment, and hence a description thereof will be omitted.

Referring to FIG. 11, a distance measurement circuit 401 obtains the distance between the coordinates of a viewpoint position detected by a viewpoint detection circuit 102 and the coordinates of a macro block on a frame. A weighting parameter circuit 402 generates parameters for weighting five fixed length macro blocks.

Assume that an image like the one shown in FIG. 4 is displayed on an LCD monitor 5, and a photographer fixes his/her eye on an upper portion (position indicated by "x") of a tree on the left side.

Figure 12:
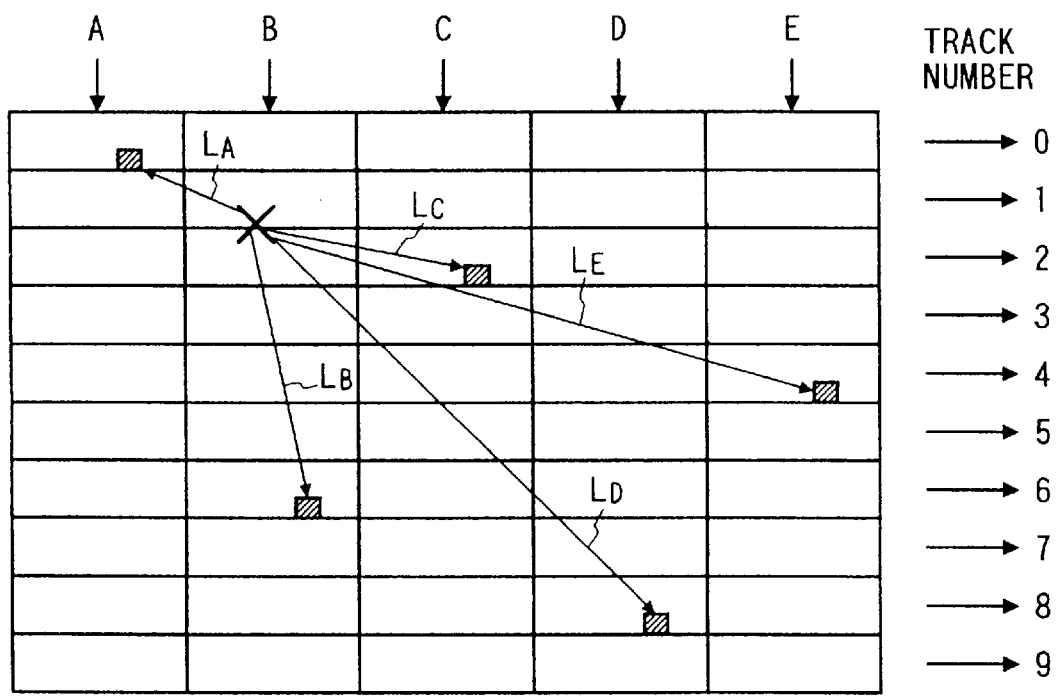
FIG. 12 is a view for explaining measurement of the distance between the coordinates of each macro block and a viewpoint position.

If a viewpoint detection switch 105 is ON, the viewpoint detection circuit 102 obtains coordinates indicating a viewpoint. As shown in FIG. 12, the distance measurement circuit 401 receives the addresses of five fixed length macro blocks ($MG_A$, $MB_B$, $MB_C$, $MB_D$, and $MB_E$), converts the addresses into coordinates, and obtains the distances ($L_A$, $L_B$, $L_C$, $L_D$, and $L_E$) between the coordinates of the viewpoint and those of the macro blocks. In this case, $L_A<L_B<L_C<L_D<L_E$, and the weighting parameter circuit 402 generates weighting parameters such that bit allocation is preferentially performed with respect to the macro blocks located nearer to the viewpoint. In this case, weighting parameters are generated such that bit allocation is preferentially performed with respect to the macro block $MB_A$ nearest to the viewpoint, and the smallest number of bits are allocated to the macro block $MBG_E$ farthest from the viewpoint.

A code amount estimation circuit 10' estimates a code amount on the basis of the data of the five macro blocks ($MB_C$, $MB_B$, $MB_D$, $MB_A$, and $MB_E$) from a sort circuit 9, the image quality parameters of the respective DCT blocks, and the weighting parameters, and controls a quantization step width for an adaptive quantization circuit 11.

Figure 13:
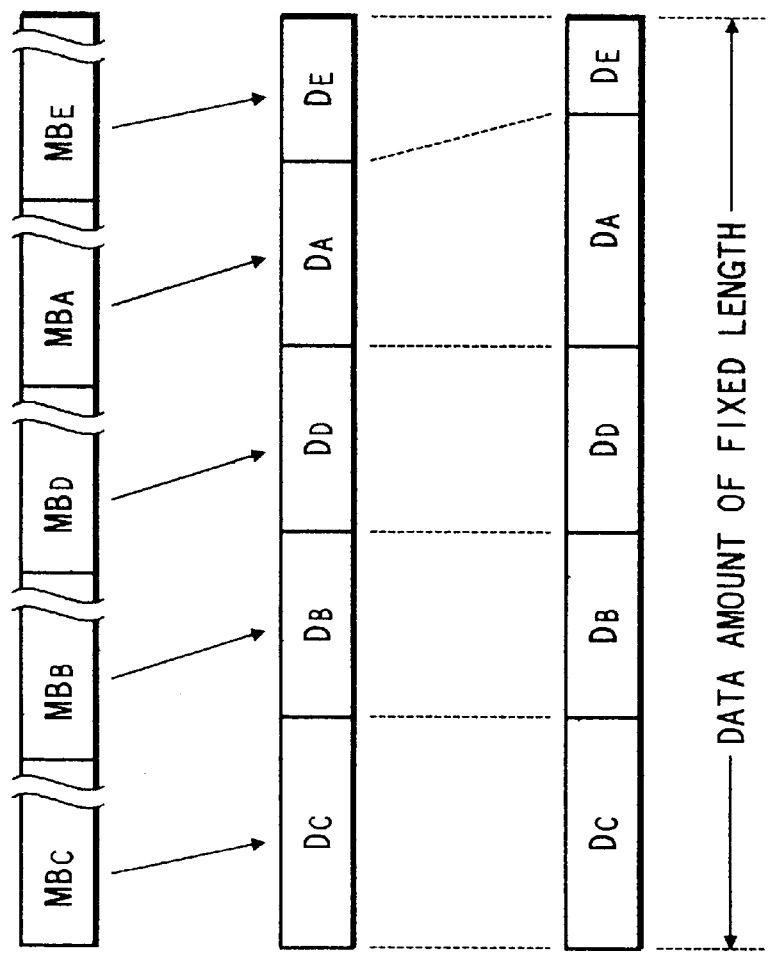
FIGS. 13A to 13C are views showing changes in bit allocation to image data in the fourth embodiment when a viewpoint detection result is used.

FIGS. 13A to 13C are views showing variations in bit allocation in accordance with the operation of the viewpoint detection switch 105.

FIG. 13A shows the data of five macro blocks as one fixed length unit before compression.

FIG. 13B shows bit allocation after data compression when the viewpoint detection switch 105 is OFF.

In this case, data $D_C$, $D_B$, $D_D$, $D_A$, and $D_E$ are obtained after conversion to variable length codes. The five macro blocks are almost fixed length codes. If this image is identical to that in the prior art, bit allocation is performed in the same manner.

FIG. 13C shows bit allocation after data compression when the viewpoint detection switch 105 is ON.

Bit allocation is preferentially performed with respect to the macro block $MB_A$, but the number of bits allocated to the macro block $MB_E$ is small. Methods of weighting macro blocks include a method of adding an offset to the image quality parameter of each DCT block to increase/decrease the number of bits to be allocated, a method of giving a slope to the quantization parameter of each macro block, and the like. In any case, a bit amount $D_A$ of the macro block $MB_A$ nearest to the viewpoint position after compression is larger than that when the viewpoint detection switch 105 is OFF, but a bit amount $D_E$ of the macro block $MB_E$ farthest from the viewpoint position is smaller than that when the viewpoint detection switch 105 is OFF.

Processing other than that described above is the same as that in the second embodiment, and hence a description thereof will be omitted.

Figure 14:
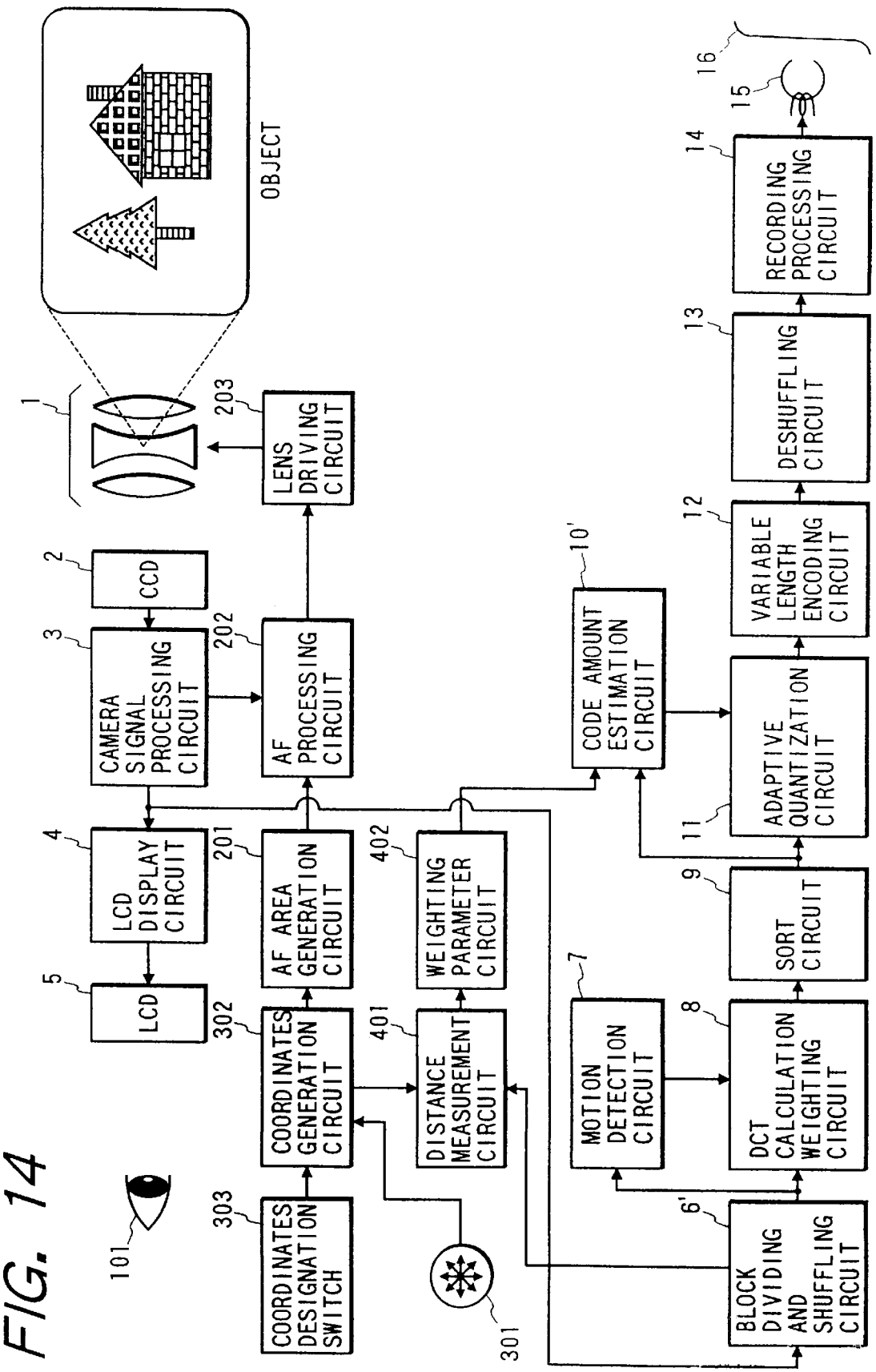
FIG. 14 is a block diagram showing the arrangement of a VTR with a built-in camera according to the fifth embodiment of the present invention.

FIG. 14 is a block diagram showing the arrangement of a VTR with a built-in camera according to the fifth embodiment of the present invention. The same reference numerals in FIG. 14 denote the same parts as in FIGS. 9 or 11, and a description thereof will be omitted. Only a method of designating a priority area in the fifth embodiment, which is different from that in the fourth embodiment, will be described below. Since other operations are the same as those in the fourth embodiment, a description thereof will be omitted.

The operation of the VTR with the built-in camera having the arrangement in FIG. 14 will be described below. Assume that a house is located in the center of a frame, and a tree is on the left side of the house, and these objects are at different distances from a photographer. Similar to the fourth embodiment, first of all, each object image is formed on an image pickup element 2 through the lens group 1, and converted into an electrical signal. The signal is the processed to display an image on an LCD monitor 5.

If a coordinates designation switch 303 is ON, a coordinates generation switch 302 generates coordinates information in accordance with a designation from a direction switch 301.

When the photographer wants to fix his/her eye on an upper portion (position indicated by "x") of the tree as shown in FIG. 10, he/she turns on the coordinates designation switch 303, and operates the direction switch 301 to bring the AF area in the frame near the position indicated by "x".

An AF area generation circuit 201 generates an automatic focusing area (the AF area in FIG. 10) on the basis of the coordinates information generated by the coordinates generation circuit 302. An AF processing circuit 202 generates a focus control signal on the basis of the high-frequency component of an image signal from a camera signal processing circuit 3 and the automatic focusing area information, and a lens driving circuit 203 drives the lens group 1 to focus the camera on the upper portion (the AF area in FIG. 10) of the tree. At this time, the house in the center of the frame is out of focus. Meanwhile, a distance measurement circuit 401 and a weighting parameter circuit 402 perform processing similar to that in the fourth embodiment on the basis of the coordinates information from the coordinates generation switch 302.

In addition, an image signal from the camera signal processing circuit 3 is processed in the same manner as in the fourth embodiment, and the resultant data is recorded on a magnetic tape 16.

The principle of viewpoint detection, i.e., detection of the viewpoint of a photographer on a finder used in the first, second, and fourth embodiments will be described below.

FIGS. 15A and 15B show the principle of a viewpoint detection method. FIG. 15A shows the upper surface of the finder. FIG. 15B shows a side surface of the finder.

Referring to FIGS. 15A and 15B, light sources 506a and 506b such as light-emitting diodes (IREDs) emit infrared light to which the photographer is insensitive. The light sources 506a and 506b are arranged to be symmetrical (see FIG. 15A) about the optical axis of an imaging lens 511 in the x direction (horizontal direction) and slightly below (see FIG. 15B) the optical axis in the y direction (vertical direction). These light sources illuminate an eyeball of the photographer with divergence light.

Part of illumination light reflected by the eyeball is focused onto an image sensor 512 through the imaging lens 511.

Referring to FIGS. 15A and 15B, the light-emitting diodes 506a and 506b correspond to the ILED 103 in FIGS. 1, 7, and 11, and the image sensor 512 corresponds to the CCD sensor 104 in FIGS. 7 and 11.

Figure 16A:
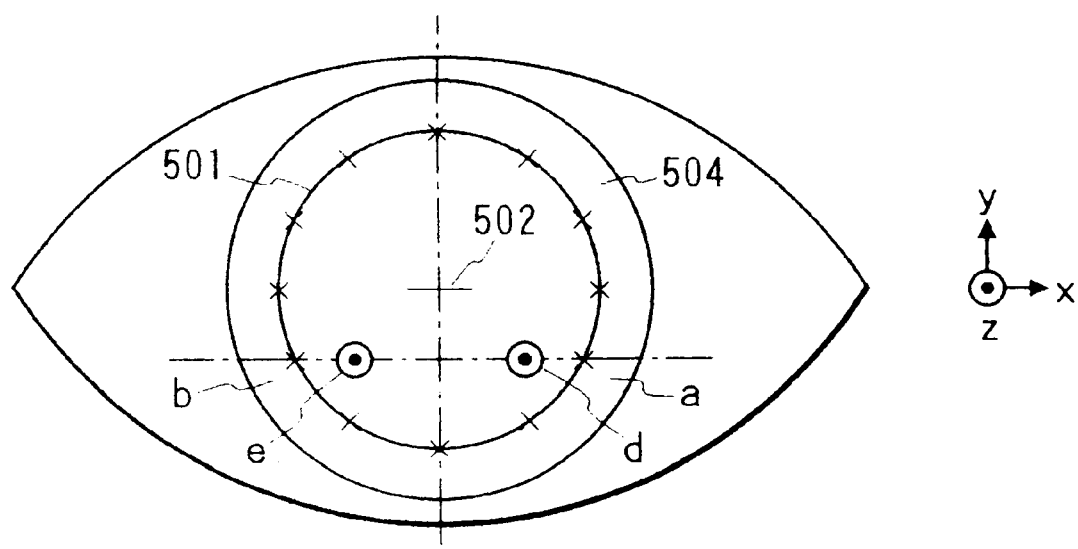
FIGS. 16A and 16B are views for explaining the output intensity of an image sensor 512 in FIGS. 15A and 15B.
Figure 16B:
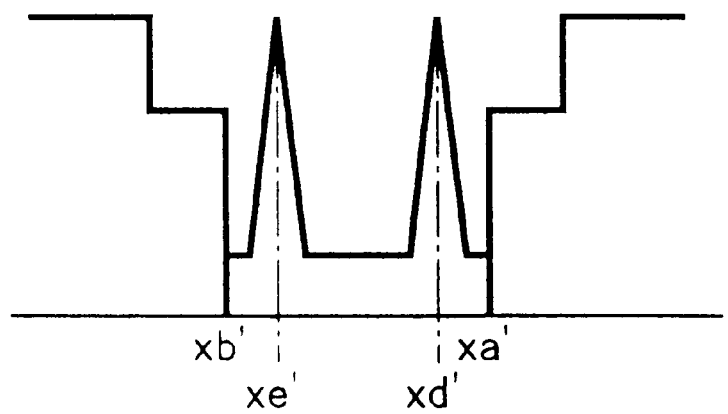
Figure 17:
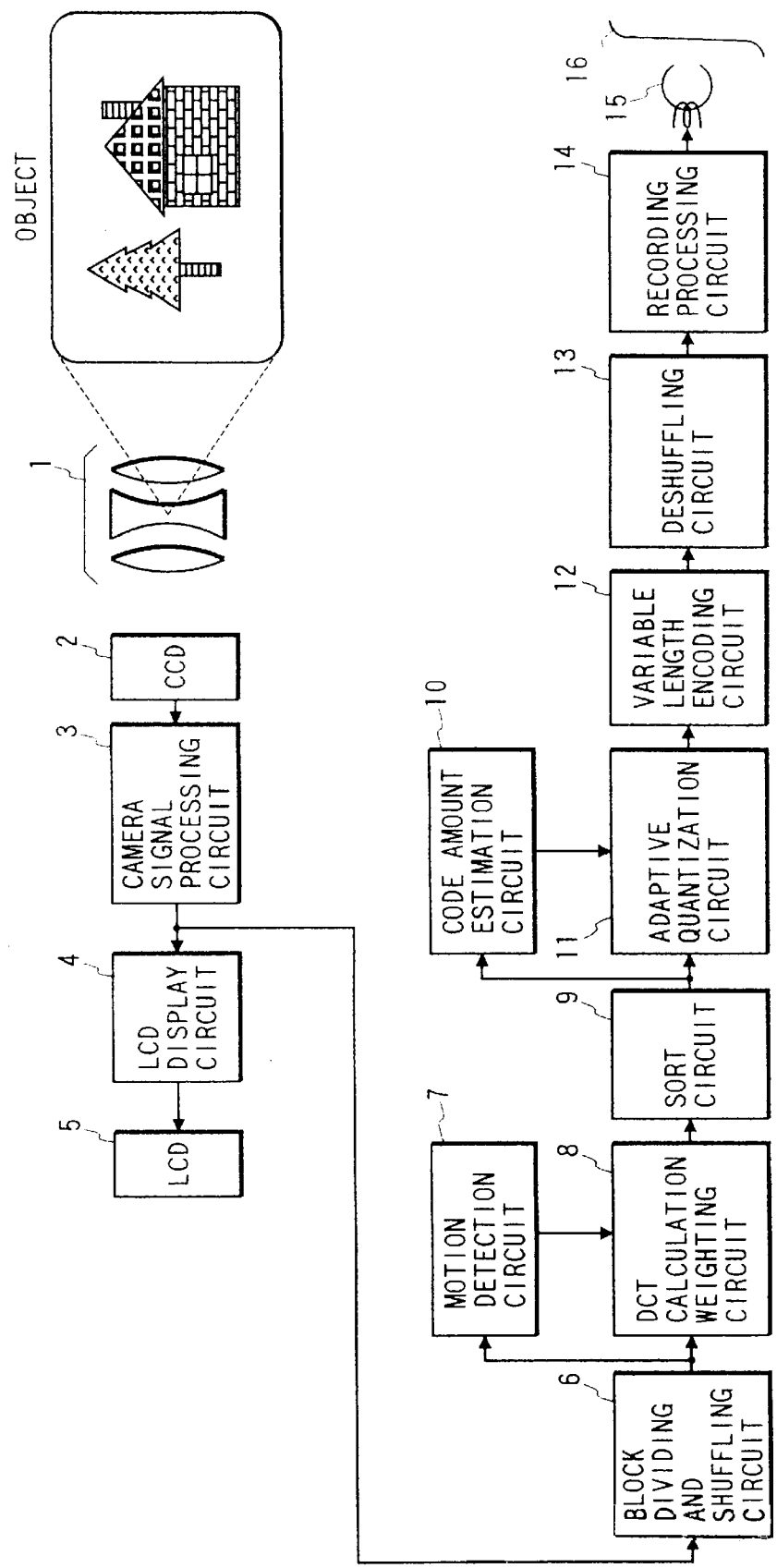
FIG. 17 is a block diagram showing the arrangement of a conventional VTR with a built-in camera which is used to record digital signals.

FIGS. 16A and 16B are views for explaining the output intensity of the image sensor 512. Note that the same reference numerals in FIGS. 16A and 16B denote the same parts as in FIGS. 15A and 15B.

FIG. 16A is a schematic view showing an eyeball image projected on the image sensor 512. FIG. 16B is a graph showing the output intensity of the image sensor 512.

The viewpoint detection method will be described below with reference to FIGS. 15A, 15b, 16A, and 16B.

Consider a horizontal plane first. Referring to FIG. 15A, infrared light emitted from the light source 506b illuminates a cornea 510 of an eyeball 508 of the photographer. A cornea reflection image d (virtual image) formed by infrared light reflected by the surface of the cornea 510 is focused by the imaging lens 511. The resultant image is formed at a position d' on the image sensor 512.

Similarly, infrared light emitted from the light source 506a illuminates the cornea 510.

In this case, cornea reflection image e (virtual image) formed by infrared light reflected by the surface of the cornea 510 is focused by the imaging lens 511. The resultant image is formed at a position e' on the image sensor 512.

Light beams from end portions a and b of an iris 504 are formed into images of the end portions a and b at positions a' and b' on the image sensor 512 through the imaging lens 511. Assume that a rotational angle θ of the optical axis of the eyeball 508 with respect to the optical axis of the imaging lens 511 is small. In this case, if the x-coordinates of the end portions a and b of the iris 504 are represented by xa and xb, respectively, many points ("x" in FIG. 16A) can be obtained as the coordinates xa and xb on the image sensor.

A pupil center xc is calculated by the least squares method. Letting xo be the x-coordinate of a curvature center o of the cornea 510, a rotational angle θx with respect to the optical axis of the eyeball 508 is given by $$oc \times \sin \theta x = xc - xo \tag{1}$$

In consideration of a predetermined correction value δx at a middle point k between the cornea reflection images d and e, the x-coordinate xo is given as follows:

$$xk = (xd + xe)/2$$

$$xo = (xd + xe)/2 + \delta x \tag{2}$$

In this case, the correction value δx is a numerical value geometrically obtained from a method of mounting the apparatus, the eyeball distance, and the like. A description of a method of calculating this value will be omitted. With a substitution of equation (1) into equation (2), the rotational angle θx is given by $$\theta x = \arcsin \left[ [xc - \{(xd + xe)/2 + \delta x\}]/oc \right] \tag{3}$$

In addition, equation (3) can be written into equation (4) as follows, with a prime "'" being added to the coordinates of the respective feature points projected on the image sensor:

$$\theta x = \arcsin \left[ [xc' - \{(xd' + xe')/2 + \delta x'\}]/oc/\beta \right] \tag{4}$$

where β is the magnification determined by a distance sze between the imaging lens 511 and the eye. In practice, the magnification β is obtained as a function of a distance |xd'−xe'| between cornea reflection images.

Consider a vertical plane next. FIG. 15B shows a corresponding arrangement. In this case, cornea reflection images formed by the two IREDs 506a and 506b are focused at the same position i.

A method of calculating a rotational angle θy of the eyeball is almost the same as that in the case of the horizontal plane, but only equation (2) is different. Letting yo be the y-coordinate of the curvature center o of the cornea, $$yo = yi + \delta y \tag{5}$$

where δy is a numerical value geometrically obtained from a method of mounting the apparatus, the eyeball distance, and the like. A description of a method of calculating this value will be omitted. The rotational angle θy in the vertical direction is given by $$\theta y = \arcsin \left[ [yc' - (yi' + \delta y')]/oc/\beta \right] \tag{6}$$

The coordinates (xn, yn) of a position on a finder frame of the video camera are obtained on the horizontal and vertical planes, respectively, as follows, using a constant m determined by a finder optical system:

$$xn = m \times \arcsin \left[ [xc' - \{(xd' + xe')/2 + \delta x'\}]/oc/\beta \right] \tag{7}$$

$$yn = m \times \arcsin \left[ [yc' - (yi' + \delta y')]/oc/\beta \right] \tag{8}$$

As is apparent from FIG. 16A, pupil edges are detected by using the leading edge (xb') and trailing edge (xa') of an image sensor output In addition, the coordinate of a cornea reflection image are obtained by using steep leading edge portions (xe') and (xd').

Other embodiments and modifications of the invention can be made without departing from the spirit and scope of the invention.

In other words, the foregoing description of embodiments has been given for illustrative purpose only and is not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus for dividing an image signal corresponding to one frame into a plurality of blocks, and performing compression encoding for each block, comprising:

a) display means for displaying the image signal;
   b) detection means for detecting a viewpoint position of an operator on said display means; and
   c) compression encoding means for encoding the image signal on the unit basis of the block; and
   d) control means for controlling an encoding parameter used by said compression encoding means, on the unit basis of the block according to the viewpoint position detected by said detecting means.

2. An apparatus according to claim 1, wherein said control means detects distances between the viewpoint position detected by said detection means and the blocks, and controls the encoding parameter for the blocks on the basis of the detection result.

3. An apparatus according to claim 1, wherein said compression encoding means includes orthogonal transformation means for performing orthogonal transformation of the image signal, and quantization means for quantizing the image signal having undergone orthogonal transformation.

4. An apparatus according to claim 3, wherein the encoding parameter is a quantization step of said quantization means.

5. An apparatus according to claim 4, wherein said orthogonal transformation means is discrete cosine transform.

6. An image processing apparatus for dividing an image signal corresponding to one frame into a plurality of blocks, and performing compression encoding for each block, the image signal being output from a camera unit having focus adjustment means for performing focus adjustment, comprising:
 a) display means for displaying the image signal;
 b) detection means for detecting a viewpoint position of an operator on said display means;
 c) compression encoding means for encoding the image signal on the unit basis of the block;
 d) encoding parameter control means for controlling an encoding parameter used by said compression encoding means on the unit basis of the block in accordance with the viewpoint position detected by said detection means; and
 e) focus control means for controlling said focus adjustment means in accordance with the viewpoint position detected by said detection means.

7. An apparatus according to claim 6, wherein said encoding parameter control means detects distances between the viewpoint position detected by said detection means and the blocks, and controls the encoding parameter for the blocks on the basis of the detection result.

8. An apparatus according to claim 6, wherein said compression encoding means includes orthogonal transformation means for performing orthogonal transformation of the image signal, and quantization means for quantizing the image signal having undergone orthogonal transformation.

9. An apparatus according to claim 8, wherein said encoding parameter is a quantization step of said quantization means.

10. An apparatus according to claim 9, wherein said orthogonal transformation means is discrete cosine transform.

11. An image processing apparatus for dividing an image signal corresponding to one frame into a plurality of blocks, and performing compression encoding for each block, comprising:
 a) display means for displaying the image signal;
 b) designation means for designating a position desired by a user on said display means; and
 c) compression encoding means for encoding the image signal on the unit basis of the block; and
 d) control means for controlling an encoding parameter used by said compression encoding means on the unit basis of the block according to the desired position designated by said designation means.

12. An apparatus according to claim 11, wherein said control means detects distances between the position designated by said designating means and the blocks, and controls the encoding parameter for the blocks on the basis of the designation result.

13. An apparatus according to claim 11, wherein said compression encoding means includes orthogonal transformation means for performing orthogonal transformation of the image signal, and quantization means for quantizing the image signal having undergone orthogonal transformation.

14. An apparatus according to claim 13, wherein said encoding parameter is a quantization step of said quantization means.

15. An apparatus according to claim 14, wherein said orthogonal transformation means is discrete cosine transform.

16. An image processing apparatus for dividing an image signal corresponding to one frame into a plurality of blocks, and performing compression encoding for each block, the image signal being output from a camera unit having focus adjustment means for performing focus adjustment, comprising:
 a) display means for displaying the image signal;
 b) designation means for designating a position desired by a user on said display means;
 c) compression encoding means for encoding the image signal on the unit basis of the block;
 d) control means for controlling an encoding parameter used by said compressing encoding means on the unit basis of the block in accordance with the desired position designated by said designation means; and
 e) focus control means for controlling said focus adjustment means in accordance with the desired position designated by said designation means.

17. An apparatus according to claim 16, wherein said control means detects distances between the position designated by said designating means and the blocks, and controls the encoding parameter for the blocks on the basis of the designation result.

18. An apparatus according to claim 16, wherein said compression encoding means includes orthogonal transformation means for performing orthogonal transformation of the image signal, and quantization means for quantizing the image signal having undergone orthogonal transformation.

19. An apparatus according to claim 18, wherein said encoding parameter is a quantization step of said quantization means.

20. An apparatus according to claim 19, wherein said orthogonal transformation means is discrete cosine transform.

21. An image processing apparatus for dividing an image signal corresponding to one frame into a continuous succession of blocks, and performing compression encoding for each block, comprising:
 a) block identifying means for identifying at least one of said blocks defining a portion of the image defined in said image signal and desired for enhanced resolution processing; and
 b) compression encoding means for weighting all of the blocks and performing compression encoding therefor, said compression encoding means allocating in the compression a greater number of bits to said at least one block than to the others of said plurality of blocks and outputting a compression encoded succession of the blocks,
 said block identifying means including display means for displaying the image signal and detection means for detecting a viewpoint position of an operator on said display means and identifying said at least one block responsively to detection by said detecting means.

22. An apparatus according to claim 21, wherein said block identifying means further includes designation means for designating a position desired by a user on said display means and identifies said at least one block responsively to the position designated by said designation means.

23. An apparatus according to claim 21, further including focus adjustment means and control means for controlling said focus adjustment means in accordance with block identification by said block identifying means.

24. An image processing method for dividing an image signal corresponding to one frame into a plurality of blocks, and performing compression encoding for each block, comprising the steps of:

a) displaying the image signal;

b) detecting a viewpoint position of an operator on the display;

c) compression encoding the image signal on the unit basis of the block; and d) controlling an encoding parameter used in said compressing encoding step on the unit basis of the block according to the detected viewpoint position.

25. An image processing method for dividing an image signal corresponding to one frame into a plurality of blocks, and performing compression encoding for each block, the image signal being output from a camera having focus adjustment means for performing focus adjustment, comprising the steps of:

a) displaying the image signal;

b) detecting a viewpoint position of an operator on the display;

c) compression encoding the image signal on the unit basis of the block;

d) controlling an encoding parameter used in said compression encoding step on the unit basis of the block in accordance with the detected viewpoint position; and e) controlling said focus adjustment means in accordance with the detected viewpoint position.

26. An image processing method for dividing an image signal corresponding to one frame into a plurality of blocks, and performing compression encoding for each block, comprising the steps of:

a) displaying the image signal;

b) designating a position desired by a user on the display;

c) compression encoding the image signal on the unit basis of the block; and d) controlling an encoding parameter used in said compression encoding step on the unit basis of the block according to the designated position.

27. An image processing method for dividing an image signal corresponding to one frame into a plurality of blocks, and performing compression encoding for each block, the image signal being output from a camera having focus adjustment means for performing focus adjustment, comprising the steps of:

a) displaying the image signal;

b) designating a position desired by a user on the display;

c) compression encoding the image signal on the unit basis of the block;

d) controlling an encoding parameter used in said compression encoding step on the unit basis of the block in accordance with the designated position; and e) controlling said focus adjustment means in accordance with the designated position.

28. An image processing method for dividing an image signal corresponding to one frame into a continuous succession of blocks, and performing compression encoding for each block, comprising the steps of:

a) identifying at least one of said blocks defining a portion of the image defined in said image signal and desired for enhanced resolution processing; and b) weighting all of the blocks and performing compression encoding therefor, allocating in the compression a greater number of bits to said at least one block than to the others of said plurality of blocks and outputting a compression encoded succession of the blocks.

* * * * *

UNITED STATES PATENT AND TRADEMARK OFFICE
CERTIFICATE OF CORRECTION

PATENT NO. : 5,909,240
DATED : June 1, 1999
INVENTOR(S) : Taizou Hori

It is certified that error appears in the above-identified patent and that said Letters Patent is hereby corrected as shown below:

Col. 5, line 23, delete "circuit 101" and insert -- circuit 10' --.
Col. 8, line 6, delete "the processed" and insert -- then processed --.
Col. 8, line 39, delete "circuit 10" and insert -- circuit 10' --.
Col. 11, line 2, delete "15b" and insert -- 15B --.
Col. 11, line 58, delete "sze" and insert -- size --.

Signed and Sealed this

Twelfth Day of September, 2000

Attest:

Q. TODD DICKINSON

*Attesting Officer*     *Director of Patents and Trademarks*